United States Patent [19]

Le et al.

[11] Patent Number: 4,613,875

[45] Date of Patent: Sep. 23, 1986

[54] AIR ASSISTED INK JET HEAD WITH PROJECTING INTERNAL INK DROP-FORMING ORIFICE OUTLET

[75] Inventors: Hue P. Le; Charles W. Jaeger; James C. Oswald, all of Beaverton, Oreg.

[73] Assignee: Tektronix, Inc., Beaverton, Oreg.

[21] Appl. No.: 720,843

[22] Filed: Apr. 8, 1985

[51] Int. Cl.[4] .......... G01D 15/18

[52] U.S. Cl. .......... 346/140 R

[58] Field of Search .......... 346/75, 140; 239/105, 239/291, 299

[56] References Cited

U.S. PATENT DOCUMENTS

| | | | |
|---|---|---|---|
| 3,747,120 | 7/1973 | Stemme | 346/140 |
| 3,805,273 | 4/1974 | Brady | 346/75 |
| 4,002,230 | 1/1977 | Schweppe | 346/75 X |
| 4,106,032 | 8/1978 | Miura | 346/140 |
| 4,312,010 | 1/1982 | Doring | 346/140 |
| 4,380,018 | 4/1983 | Andoh | 346/140 |
| 4,413,268 | 11/1983 | Bentin | 346/140 |
| 4,422,082 | 12/1983 | Louzil | 346/140 X |
| 4,549,188 | 4/1985 | Shackleton | 346/1.1 |
| 4,555,717 | 11/1985 | Miura | 346/140 |

FOREIGN PATENT DOCUMENTS 0121623 10/1984 European Pat. Off. .

OTHER PUBLICATIONS

Doering et al; Droplet Emission with Micro-Planar Ink Drop Generators; SID Symposium Digest, 1984, pp. 364–367.

Doring, M; Ink-Jet Printing, Philips Technical Review, 40, No. 7, 1982, pp. 192–198.

Dollenmayer, W. L.; Ink Jet Nozzle Design, IBM Tech. Disc. Bulletin, vol. 22, No. 6, Nov. 1979, pp. 2333–2334.

*Primary Examiner*—Joseph W. Hartary

*Attorney, Agent, or Firm*—John D. Winkelman; David P. Petersen

[57] ABSTRACT

An air assisted drop-on-demand ink jet head 10 has an ink chamber with an ink drop-forming orifice outlet 23 from which ink drops are generated in response to pressure waves caused by a piezoelectric crystal 56. The ink drops are carried by air outwardly through an external orifice 24 and toward printing medium. The internal orifice outlet 23 is centered in a projecting structure 48 which extends toward the external orifice 24. In one form, the projection 48 is of a frustoconical or mesa-like shape. Air flowing past the top of the projection prevents ink from wetting anything but the top of the projection, resulting in highly uniform ink drop formation with a single uniform dot being produced on the printing medium in response to each pressure wave.

16 Claims, 10 Drawing Figures

FIG. 1
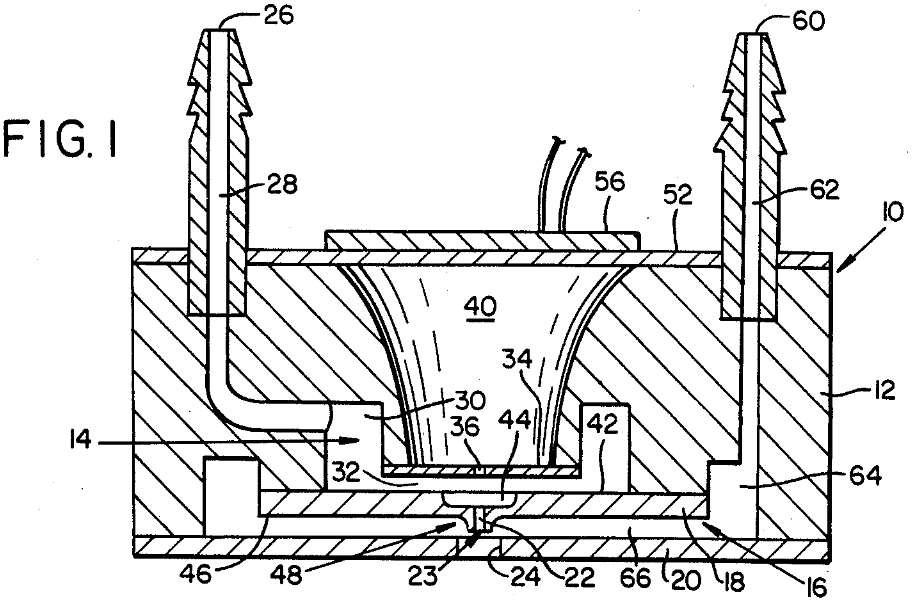
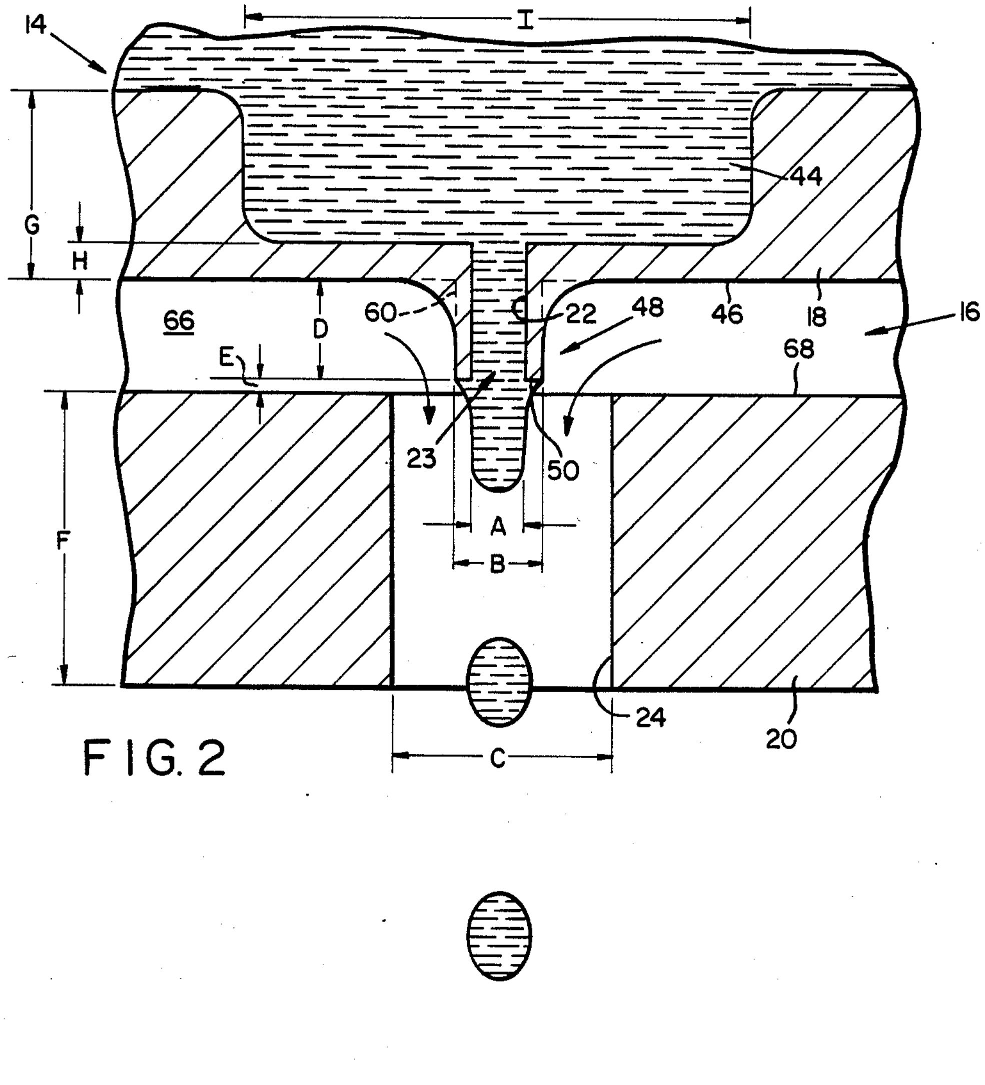
FIG. 2

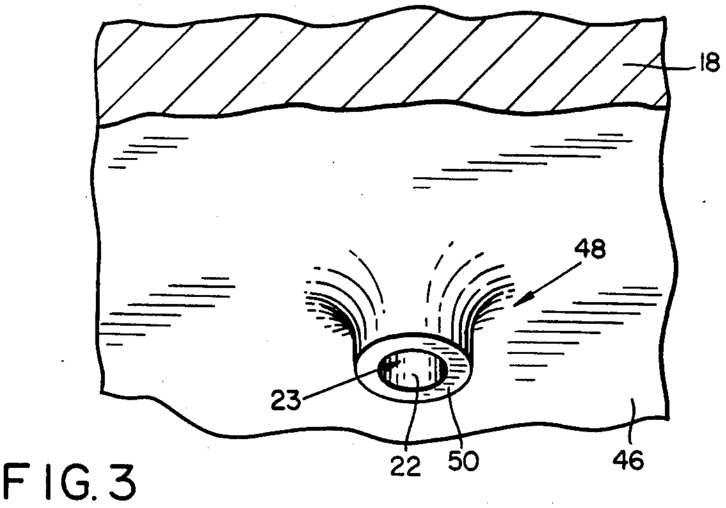
FIG. 3
FIG. 4
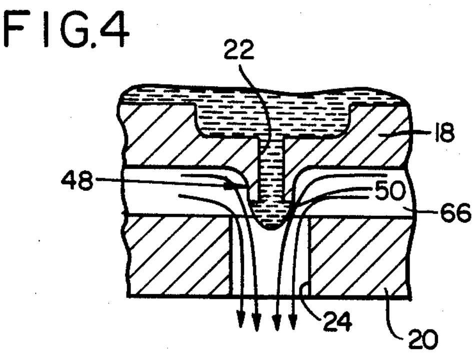
FIG. 5
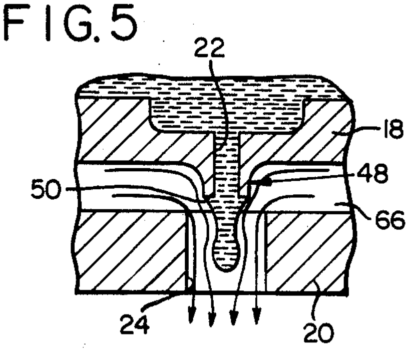
FIG. 6
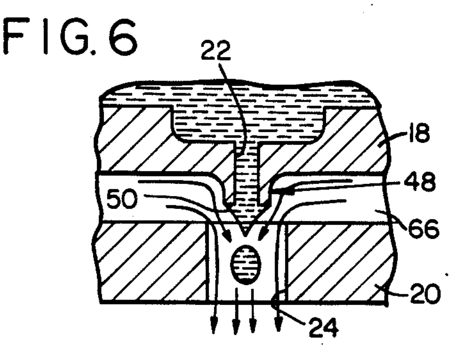
FIG. 7
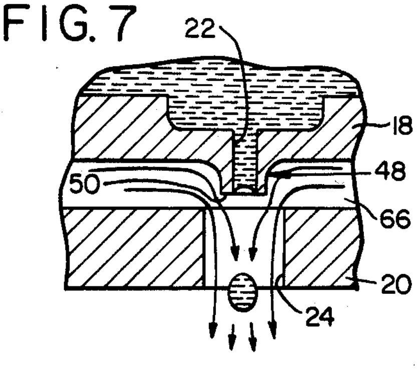

AIR ASSISTED INK JET HEAD WITH PROJECTING INTERNAL INK DROP-FORMING ORIFICE OUTLET

TECHNICAL FIELD

This invention relates to ink jet heads for ink jet printers, and in particular to an air assisted drop on demand ink jet head with an internal ink drop-forming orifice outlet which projects toward an external orifice of the head.

BACKGROUND OF THE INVENTION

Ink jet printers having one or more ink jet heads for projecting drops of ink onto paper or other printing medium to generate graphic images and text have become increasingly popular. To form color images, ink jet printers with multiple ink jet printing heads are used, with each head being supplied with ink of a different color. These colored inks are then apolied, either alone or in combination, to the printing medium to make a finished color print. Typically, all of the colors needed to make the print are produced from combinations of cyan, magenta, and yellow ink. In addition, black ink may be utilized for printing textual material or for producing true four-color prints.

In a common arrangement, the print medium is attached to a rotating drum, with the ink jet heads being mounted on a traveling carriage that traverses the drum axially. As the heads scan paths over the printing medium, ink drops are projected from a minute external orifice in each head to the medium so as to form an image on the medium. A suitable control system synchronizes the generation of ink drops with the rotating drum.

To produce images of certain colors, more than one color of ink is combined on the medium. That is, ink drops of a first color are applied to the medium and then overlayed with ink drops of a second color to produce the desired color of the image. If the drops do not converge on the same position on the medium, that is, the drops of the two colors do not overlay one another, then the color of the image is distorted. Furthermore, it is also important that drops of substantially uniform size and shape be generated by the ink jet heads. To the extent that the drops are non-uniform, the image is distorted. This distortion affects the clarity of textual images as well as of pictoral images.

In one basic type of ink jet head, ink drops are produced on demand. An exemplary drop-on-demand ink jet head is illustrated in U.S. Pat. No. 4,106,032 of Miura, et al. In the Miura ink jet head, ink is delivered to an ink chamber in the ink jet head. Whenever a drop of ink is needed, an electric pulse is applied to a piezoelectric crystal, causing the crystal to constrict. As a result, because the crystal is in intimate mechanical contact with ink in the ink chamber, a pressure wave is transmitted through the ink chamber. In response to this pressure wave, ink flows through an ink passageway in an ink chamber wall and forms an ink drop at an internal drop-forming orifice outlet located at the outer surface of the ink chamber wall. The ink drop passes from the drop-forming orifice outlet and through an air chamber toward a main external orifice of the ink jet head. This latter orifice is aligned with the internal orifice and leads to the printing medium. Air under pressure is delivered to the air chamber and entrains the drop of ink in a generally concentric air stream as the ink drop travels through the air chamber. This air stream increases the speed of the drops toward, and the accuracy of applying the drops to, the print medium.

In known prior art air assisted drop-on-demand ink jet heads, the outer surface of the ink chamber wall is planar and the internal ink drop-forming orifice outlet is in the plane of this outer surface. In operation, air entering the air chamber flows inwardly from all directions toward the internal ink drop-forming orifice outlet, meets at about the location of the outlet, and then turns outwardly to flow through the external ink jet head orifice and accelerates the ink drops toward the print medium.

With this construction, a zone of stagnant air exists around the internal drop-forming orifice outlet. Moreover, ink tends to flow from the ink drop-forming orifice outlet onto the outer surface of the ink chamber wall which surrounds the orifice outlet. This wetting reduces print quality by increasing the generation of one or more spurious droplets called satellites, in addition to the main droplet of interest, in response to a pressure wave from the piezoelectric crystal. In addition, if the wetting is serious enough, it is even possible that the liquid will no longer exit the internal ink drop-forming orifice outlet as drops at all. Furthermore, if the emerging ink wets the area surrounding the ink drop-forming orifice outlet asymmetrically, the ink droplet generated in response to a pressure wave is deflected in the direction of the greatest wetting. As a result, it is more difficult to address the droplets to particular positions on the print medium. A typical addressability of prior art air assisted drop-on-demand ink jet head is approximately 150 dots per inch.

Also, to compensate for the tendency of drops to deflect from straight line travel through the external ink jet head orifice toward the print medium, the ink jet heads are typically supported relatively close to the drum and supported print medium. As a result, the external orifice may become plugged with dust and debris from the print medium. In addition, in the event the print medium loosens on the drum, because of the relatively close spacing, the print medium may slap and damage the ink jet head as the drum is rotated.

In addition, Muira type air assisted drop-on-demand ink jet heads generate ink droplets, in response to a pressure pulse, of a relatively long and irregular drop train duration. The drop train duration is the time between impact of the leading edge of the first ink droplet produced by a pulse on the print medium and the impact of the trailing edge of the last ink droplet produced in response to the pulse. In addition, such prior art ink jet heads exhibit a substantial variation in the volume of ink produced in response to a pressure pulse. Furthermore, such prior art ink jet heads are subject to the problem of ingestion of air bubbles into the ink drop-forming orifice outlet. Such bubbles, when ingested, will cause irregular drop formation and, under certain conditions, may prevent the ink jet head from operating. Finally, known prior art air assisted drop-on-demand ink jet heads are operable at typical maximum drop generation frequencies of approximately 20 kilohertz.

In one prior art attempt to reduce the extent which ink wets the surface surrounding the ink drop-forming orifice outlet, the pressure of the air delivered to the air chamber was increased from a typical pressure of thirty inches of water to fifty inches of water. This increased air pressure did have some affect in reducing the size of the pool of ink which formed at the internal drop-forming orifice outlet. However, some wetting still occurred. Furthermore, this approach increased the velocity at which ink drops were ejected from the external orifice of the ink jet head to the degree that the drops tended to splatter on the print medium. This splattering distorted the resulting image.

Another known approach used to counter the tendency of ink to wet the surface surrounding the internal ink drop-forming orifice outlet is to treat this area with an anti-wetting compound, such as a long chain fluorosilane compound. Such coatings are usually applied as thin coats or even monolayers so as not to greatly alter the characteristics of the internal drop-forming orifice outlet. Such coatings, have been only a temporary solution to the wetting problem. That is, the coatings are frequently sensitive to the constituents of the ink being sprayed, and as such, are soon washed away or contaminated to the extent that they lose their anti-wetting characteristics.

As still another prior art approach directed toward overcoming the anti-wetting problem, European patent application No. 83306260.7 of Soo, owned by Hewlett-Packard Company, discloses the embedding of ions in the surface surrounding an ink drop-forming orifice outlet together with dissolving an oppositely charged ionic anti-wetting agent in the ink. This patent application indicates that this approach reduces the wetting of the surface surrounding the ink drop-forming orifice outlet and facilitates the production of more uniform drops of ink.

Another prior art "Gould" type ink jet head is disclosed in the Dec. 5th, 1983 issue of the "Nikkei Electronics" publication. This type of head utilizes a cylindrical piezo element which expands and contracts in response to driving signals. When the element contracts, an ink chamber or ink surrounded by the element is squeezed to eject a drop of ink from a conical or cylindrical nozzle. Ink passes through a rectifying valve to the piezo element region of the head and a fluid resistance element is placed at the nozzle side of the piezo element region. A larger fluid resistance is provided at the nozzle side of the resistance element than at the rectifying valve to prevent reverse flow of ink at the nozzle side. Also, this article has one figure which appears to disclose a nozzle having a tip inserted partially into an opening through a plate. In addition, air is flowing along the surface of the nozzle and through the opening through the plate.

However, the ink jet head disclosed in the Nikkei Electronics article suffers from a number of drawbacks. That is, the use of valve and resistance elements leads to problems such as manufacturing complexities. The article mentions problems in driving the head above five kilohertz without the rectifying valve. Also, drop frequencies seem to be limited to about ten kilohertz even with the valve. In addition, relatively low air and ink pressures are apparently employed as the air flow is understood to move at approximately the speed of the ejected ink drops rather than to accelerate the generated ink drops. Furthermore, with the nozzle tip inserted into an opening through a plate, the air flow, particularly if increased in velocity, would tend to pull ink from the nozzle tip even without a pulse being applied by the piezo element, thus producing undesired drops.

In addition to air assisted drop-on-demand ink jet heads, non-air assisted ink jet heads have also been utilized, such as exemplified by U.S. Pat. No. 3,747,120 of Stemme. Non-air assisted heads suffer from a number of drawbacks when compared to air assisted heads, primarily in the fact that such non-air assisted heads apply drops of ink to printing medium at limited frequency rates, such as on the order of four kilohertz to six kilohertz.

U.S. Pat. No. 4,312,010 of Doring, U.S. Pat. No. 4,442,082 of Louzil, an article entitled "Ink-Jet Printing" published in 1982 at pages 192–198 of Phillip Technical Review No. 40, by Doring; and an article entitled "Droplet Emission With Micro-Planar Ink Drop Generators", published at page 364 in the SID 1984 Digest, by Doering, Bentin and Radtke; each relate to non-air assisted drop-on-demand ink jet heads with ink nozzles in the form of a projecting circular cylindrical tube with sharp edges and an outer surface in the shape of a ring. This tube projects from an outer wall of an ink chamber and an ink drop-forming orifice outlet is bounded by the inner edge of the ring. Page 194 (FIG. 7) of the "Ink Jet Printing" article, and page 365 of the SID 1984 Digest article, illustrates that wetting is confined to the ring surface. The SID 1984 Digest article also mentions that this surface is wetted symmetrically to provide stable and undeflected droplet emmission. Moreover, the SID 1984 Digest mentions that drop ejection rates of ten kilohertz can be achieved with the illustrated design.

Thus, although these latter references do address the problem of asymetric wetting of the surface surrounding an ink drop-forming orifice outlet, they do so only in connection with a non-air assisted drop-on-demand ink jet head. Moreover, the maximum drop repetition rates are relatively low.

Therefore, a need exists for an improved air assisted drop-on-demand ink jet head which is directed toward overcoming these and other disadvantages of prior art devices.

SUMMARY OF THE INVENTION

An air assisted drop-on-demand ink jet head has an ink chamber with an ink chamber wall having an outer surface from which an ink meniscus support projects outwardly into an air chamber of the ink jet head. The ink meniscus support includes an outer ink meniscus supporting surface spaced from the ink chamber wall. An internal ink drop-forming orifice outlet is provided in the ink meniscus supporting surface and communicates with the ink chamber through a valve free ink passageway or orifice. A concentric stream of air passes along the meniscus support and is directed outwardly through an external ink jet head orifice. This air stream aids in confining a meniscus of ink from the ink drop-forming orifice outlet to the ink meniscus supporting surface. As a result, in response to pressure pulses applied to the ink chamber by an actuator, such as a piezoelectric device, ink drops of enhanced uniformity are produced by the ink jet head.

It is accordingly one object of the invention to improve the uniformity in size and direction of emission of ink drops by an air assisted drop-on-demand ink jet head.

Another object of the invention is to provide an air assisted drop-on-demand ink jet head which produces ink drops of uniform size and shape over a wide range of drop repetition rates, including extremely high repetition rates such as forty kilohertz;

A further object of the invention is to provide an air assisted drop-on-demand ink jet head which improves the uniformity of the volume of ink ejected in response to each pressure pulse, with enhanced drop volume uniformity being provided over a wide range of drop repetition rates.

It is another object of the present invention to provide an air assisted drop-on-demand ink jet head which reduces the drop train duration, and moreover which reduces such duration over a wide range of drop repetition rates;

Another object of the present invention is to provide an air assisted drop-on-demand ink jet head which stabilizes the ink drop formation process and provides one uniform generally round dot on the printing medium in response to each pressure pulse.

Another object of the present invention is to provide an air assisted drop-on-demand ink jet head which provides a venturi effect to assist in the uniformity of ink drop formation and which permits the ejection of an ink drop in response to a relatively low operating voltage applied to a piezoelectric drive element.

Still another object of the present invention is to provide an air assisted ink jet head which minimizes the asymetric wetting of surfaces surrounding the ink drop-forming orifice outlet of the head.

Still another object of the present invention is to provide an air assisted ink jet head which enhances the laminar flow of air leaving the external orifice of the head and in which the air is directed tangentially to ink droplets formed at an internal ink drop-forming orifice outlet.

A further object of the present invention is to provide an air assisted ink jet head which is less suceptible to air bubble ingestion at the ink drop-forming orifice outlet of the head, and which thereby has improved reliability.

Still another object of the present invention is to provide an air assisted drop-on-demand ink jet head which enhances the addressability of dots on printing media, such as providing an addressability of three hundred dots per inch at high drop repetition rates.

An additional object of the present invention is to provide an air assisted drop-on-demand ink jet head which is capable of operating at a relatively greater distance from printing medium in comparison to known ink jet heads, without distorting the images reproduced on the printing medium.

These and other objects, advantages and features of the present invention will become apparent with reference to the following detailed description and drawings.

BRIEF DESCRIPTION OF THE DRAWINGS

FIG. 1 is a vertical sectional view of an ink jet head in accordance with the present invention;

FIG. 2 is an enlarged vertical sectional view of the ink drop-forming portion of the ink jet head of FIG. 1;

FIG. 3 is an isometric view of the ink drop-forming orifice portion of the ink jet head of FIG. 1;

FIG. 4 is a vertical sectional view of the ink drop-forming portion of the ink jet head of FIG. 1, prior to the generation of an ink drop;

FIG. 5 is a vertical sectional view of the ink drop-forming portion of the ink jet head of FIG. 1, with an ink drop being formed at an internal ink drop-forming orifice outlet;

FIG. 6 is a vertical sectional view of the ink drop-forming portion of the ink jet head of FIG. 1, showing an ink drop leaving the internal ink drop-forming orifice outlet and traveling toward an external orifice of the ink jet head;

FIG. 7 is a vertical sectional view of the ink drop-forming portion of the ink jet head of FIG. 1, showing an ink drop emerging from the external orifice of the ink jet head;

DETAILED DESCRIPTION OF A PREFERRED EMBODIMENT

Figure 8:
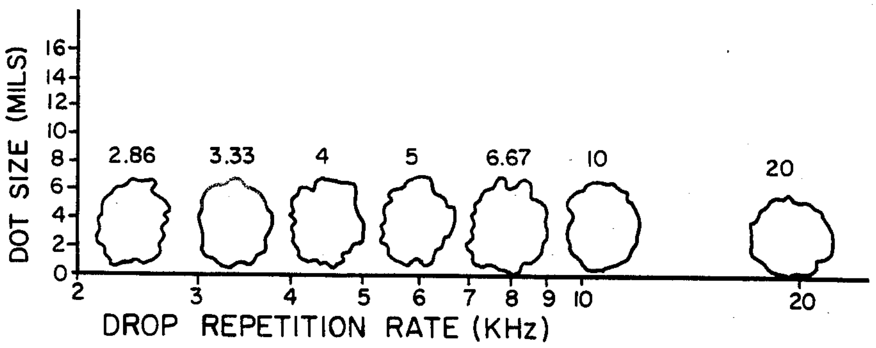
FIG. 8 is a graph illustrating the uniformity of dots formed on printing medium from the ink jet head of FIG. 1, at various drop repetition rates.

With reference to FIG. 1, an ink jet head 10 includes a body 12 within which an ink chamber 14 and an air chamber 16 are provided. The ink chamber 14 is separated from the air chamber 16 by an ink chamber wall 18. Also, the air chamber 16 is closed by an air chamber wall 20. The ink chamber 14 communicates with the air chamber through an internal ink passageway 22 provided through the ink chamber wall 18. The ink passageway 22 opens to air chamber 16 through an internal ink drop-forming orifice outlet 23. An external ink jet orifice 24, axially aligned with the ink passageway 22 and internal ink drop-forming orifice outlet 23, passes from the air chamber to the exterior of the ink jet head 10.

Ink under pressure is delivered to an ink receiving inlet 26 and fills the ink containing portions of the ink jet head. Specifically, the ink flows through and fills a passageway 28, an annular channel 30 and a region 32 between the ink chamber wall 18 and an internal wall 34. Ink also enters a cone region 40 of the head through an opening 36 in wall 34. Also, the interior surface 42 of ink chamber wall 18 is provided with a circular recessed region or dimple 44 adjacent the aperture 22. This dimple 44 is also filled with ink. In addition, ink fills the passageway 22. As explained in greater detail below, the outer or exterior surface 46 of the ink chamber wall 18 is generally planar except for a projection 48 which extends from the plane of the surface 46 toward the external orifice 24. The ink passageway 22 passes through the projection 48, as best seen in FIG. 2, and has its drop-forming orifice outlet 23 bounded by a top surface 50 of the projection. Ink entering the ink chamber 14 forms a meniscus supported on the top surface 50.

The upper end of the cone region 40 in FIG. 1 is closed by a flexible membrane 52, such as of stainless steel. An actuator 56, which may comprise a piezoelectric crystal, is stimulated by electrical pulses. In response to each pulse, a pressure wave is transmitted through the cone region 40 and causes the ejection of a droplet of ink toward the external orifice 24 from the ink drop-forming orifice outlet 23.

Pressurized air is delivered to ink jet head 10 at an inlet 60. This air flows through a passageway 62 and into an annular channel 64 which distributes the air about the circumference of the ink jet head. This air enters the space 66 between the outer surface 46 of ink chamber wall 18 and the interior or inner surface 68 of air chamber wall 20. More specifically, air flows inwardly from all directions through space 66 toward the center of the ink jet head and the projection 48. As this air approaches the center of the head, the projection 48 assists in deflecting the air outwardly through the external orifice 24 in a direction generally normal to the plane of the outer surface 46 of the ink chamber wall 18. Thus, the air flows past the outer edges of the meniscus supporting surface 50 in a directon tangential to the supported meniscus of ink. This air flow accelerates ink drops generated in response to pressure pulses and assists in carrying them outwardly from the ink jet head. In addition to accelerating the drops, this air flow assists in confining the meniscus to the top surface 50 of the projection 48. As a result, uniform and symmetric ink drops are generated by the ink jet head. These drops travel along an extremely straight path through the external orifice 24 and toward the printing medium.

With reference to FIG. 3, one embodiment of the invention employs a projection which is generally frustoconical in shape. In profile, projection 48 resembles a mesa. The base of the projection 48 is curved to assist in deflecting air traveling toward the center of the ink jet head outwardly through the external orifice 24. Also, the outer end portion of the projection 48 has an exterior surface which is generally cylindrical and of circular cross section. The axis of this cylinder is aligned with the axis of the orifice 24. As a result, enhanced laminar flow of air, as it passes the top surface 50 of the projection 48, results. This laminar air flow minimizes the possibility of the air flow diverting ink drops generated at the drop-forming orifice outlet 23 out of a straight axis of flight. In addition, with this construction, the top surface 50 comprises a flat ring surrounding the drop-forming orifice outlet 23.

The curved region at the base of the projection 48 also adds to the strength of the projection. However, this region is not required. As indicated by the dashed line 60 in FIG. 2, the projection 48 may comprise a cylinder of circular cross section. In this case, a layer of stagnant air would develop at the base of the projection. Although this stagnant air layer would assist the outward deflection of the air through external orifice 24, the resulting air flow is not believed to be as smooth as the case when the projection has a tapered base.

In a typical application, an exemplary air pressure is twenty inches of water while an exemplary ink pressure is ten inches of water. Thus, a typical pressure differential between the air and ink pressures is ten inches of water. However, a pressure differential from approximately seven to fifteen inches of water is suitable for optimum operation. With reference to FIG. 2, the following table lists typical and preferable dimensions for the components identified in this figure. It should be noted that the column identified as "Range" is not to be taken as listing the outer limits of suitable dimensions, but is a range over which the most satisfactory operation of the ink jet head is believed to result. Finally, the column labeled "Preferred" is the dimension for which optimal results are indicated from testing to date.

TABLE

| Element | Range | Preferred |
|---|---|---|
| A. Diameter of ink drop-forming orifice outlet 23 | 30–45 μm | 35 μm |
| B. Diameter of top surface 50 | 50–70 μm | 60 μm |
| C. Diameter of external orifice 24 | 125–225 μm | 150 μm |
| D. Height of projection 48 | 50–90 μm | 60 μm |
| E. Spacing from top surface 50 to plane of air chamber wall surface 68 | 0–40 μm | 15 μm |
| F. Thickness of air chamber wall 20 | 150–225 μm | 200 μm |
| G. Thickness of ink chamber wall 18 | 100–150 μm | 125 μm |
| H. Thickness of ink chamber wall 18 in region of dimple 44 | 25–90 μm | 35 μm |
| I. Diameter of dimple region 44 | 300–500 μm | 350 μm |

In addition, the drop-forming orifice outlet 23 is centered within approximately three microns of the center of the top surface 50 of the projection 48. Furthermore, the top of the projection 48 is centered within approximately five microns of the center of the external orifice 24.

In the illustrated embodiment, the projection 48 does not extend into the external orifice 24. Although the ink jet head will still function if this were the case, the air would tend to pull ink drops from the top surface 50 even without a pulse being applied to the piezoelectric drive element. Consequently, it is desirable to terminate the projection 48 at or spaced from the plane of the air chamber wall surface 68. Also, the air flowing past surface 50 provides a venturi effect which assists in the drop ejection. This venturi effect permits the ejection of a drop through the ink passageway 22 in response to a relatively low operating voltage applied to the piezoelectric drive element.

Ink drop formation by the ink jet head of the present invention is illustrated in FIG. 4 through 7. In FIG. 4, a meniscus of ink has formed on the top surface 50 of the projection 48. As indicated by the arrows in this figure, air flows along the top of the projection 48, past the outer edges of surface 50, and outwardly through the external orifice 24. This air stream confines the ink meniscus to the top surface 50 of the projection 48. Furthermore, the meniscus is generally symmetrical. In FIG. 5, in response to a pressure pulse from the piezoelectric crystal 56 (FIG. 1), a drop of ink is ejected into the air stream. In FIG. 6, the droplet has separated from ink remaining on the projection 48 and, in FIG. 7, the drop is shown exiting from the external orifice 24. Due to the relatively high differential between the ink and air pressures, a venturi effect is produced which assists in the drop formation. These drops typically travel at rates on the order of ten meters per second toward the printing medium.

With the ink jet head of the present invention, the drop formation process is stabilized with one uniform dot being produced on the printing medium per pressure pulse. That is, the majority of the ink produced with each pulse is ejected in a single drop. Although small satellite droplets may be ejected, any such satellite droplets are accelerated toward and typically join the major droplet before impacting the printing medium. Furthermore, the ink jet head of the invention provides improved control over the direction of the emission of drops from the external orifice 24.

With reference to FIG. 8, testing has shown that uniform dot size is achieved by the ink jet head of the present invention over a wide range of drop repetition rates. The representations of drops shown in FIG. 8 were taken from photographs of the results of a prototype ink jet head of FIG. 1 having a forty micron diameter ink drop-forming orifice outlet 23, and operated at 180 volts peak-to-peak drive voltage applied to the piezoelectic crystal, twenty inches of water air pressure and ten inches of water ink pressure. From this figure, it is apparent that uniform drops are produced at low repetition rates through and including a twenty kilohertz repetition rate. It should be noted that the ink dot size is affected by the diameter of the ink drop-forming orifice outlet 23, with typical dot sizes ranging from four to eight mils. Also, irregularities in edges of the depicted dots are due in large part to the type of printing medium utilized in the test and are smoothed with a different printing medium. Although not shown in FIG. 8, the ink jet head has been operated at up to forty kilohertz while still producing a uniform sized drop. Because of the uniform size of the drops, addressabilities of at least 300 dots per inch at a drop repetition rate of at least 20,000 drops per second are achievable utilizing the ink jet head of the present invention.

To provide a comparison, an air assisted drop-on-demand ink jet head of the Miura type from Matsushita Electric Industrial Co. of Japan, having a forty micron diameter ink drop-forming orifice outlet was operated at 180 volts peak-to-peak drive voltage applied to the piezoelectric crystal of the head, twenty-seven inches of water ink pressure and thirty inches of water air pressure. These pressures minimized the drop train duration of this device. This ink jet head produced dots which were larger size than those illustrated in FIG. 8. Furthermore, the dots produced by this device varied in size depending upon the drop repetition rate. That is, the size of the dots increased with repetition rates to 6.67 kilohertz and then decreased in size somewhat at higher repetition rates.

Figure 9:
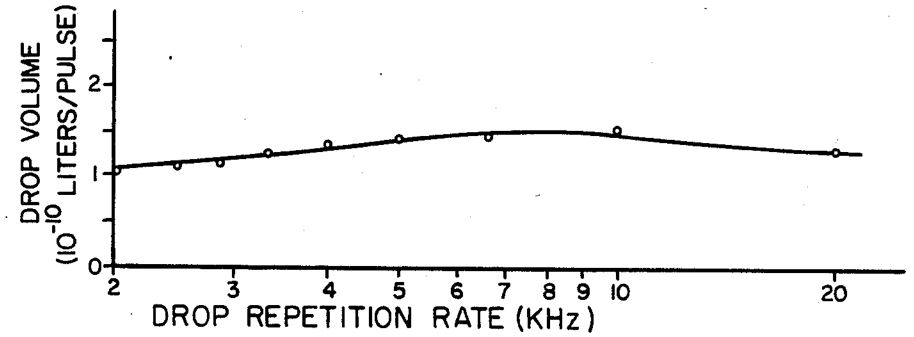
FIG. 9 is a graph illustrating the volume of ink generated in response to a pressure pulse by the ink jet head of FIG. 1 at various drop repetition rates.

FIG. 9 illustrates test results from an ink jet head in accordance with the invention operated under the conditions set forth in connection with FIG. 8. Over a range of repetition rates from two to twenty kilohertz, the volume of ink generated in response to each aoplied pulse was substantially constant. In comparison, a Matsushita ink jet head operated under the conditions set forth above, produced higher volumes of ink with each pulse, with the volume increasing substantially between four and 6.67 kilohertz and then decreasing thereafter.

Figure 10:
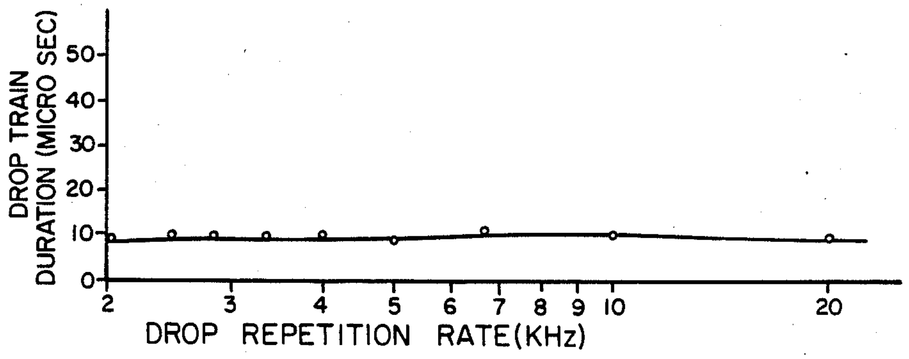
FIG. 10 is a graph illustrating the drop train duration of drops produced by the ink jet head of FIG. 1 at various repetition rates.

With reference to FIG. 10, the drop train duration in microseconds for an ink jet head in accordance with the present invention, operated under the conditions set forth above in connection with FIG. 8, is shown for various drop repetition rates. From this figure it is apparent that the drop train duration was on the order of ten microseconds and remained substantially constant as the drop repetition rate was varied. A uniform drop train duration enhances the uniformity of dots produced on orinting medium in response to a pulse over various frequency rates. In comparison, the drop train duration for a Matsushita ink jet head operated as set forth above, was approximately forty-five microseconds at low repetition rates. The drop train duration increased to over eighty microseconds when the drop repetition rate was between six and seven kilohertz and then decreased as the repetition rate was increased.

In addition, an ink jet head constructed in accordance with the present invention, apparently due to the length of the ink passageway 22, seems to minimize the ingestion of air bubbles into the ink drop-forming orifice outlet 23. Such air bubbles can cause irregular drop formation by the ink jet head and, under certain conditions, can cause the head to cease to operate.

Moreover, the ink jet head of the present invention is capable of operation at relatively large distances from the printing medium. In testing at distances of from twenty mils to eighty mils, the ink jet head of the present invention produced dots on the printing medium which were of similar size.

The ink chamber wall 18 with the projection 48 may be manufactured by conventional electon discharge machining procedures. For example, a stainless steel plate may be chemically etched to provide the roughed projection 48. An annular electrode may then be used to smooth the outer surfaces of the projection using electron discharge machining techniques. A solid wire electrode is then used to electron discharge machine the dimple area 44 in the rear surface of the ink chamber wall. Finally, a small diameter solid wire electrode is used to form the passageway 22 and the ink drop-forming orifice outlet 23. The ink chamber wall is then assembled in place on the body 12 and the air chamber wall 20 is fastened in place. Of course, other methods of manufacturing the ink jet head such as electroforming or micropunching, will be apparent to those skilled in the art.

Having illustrated and described the principles of our invention with reference to several preferred embodiments, it should be apparent to those persons skilled in the art that such invention may be modified in arrangement and detail without departing from such principles. We claim as our invention all such modifications as come within the true spirit and scope of the following claims.

We claim:

1. In an ink jet head including an ink chamber which is adapted to receive ink under pressure, the ink chamber having an ink chamber wall with a valve free ink passageway leading to an internal ink drop-forming orifice outlet, an actuator which applies pressure pulse to the ink chamber so as to cause ink to flow through the ink passageway and produce an ink drop at the internal ink drop-forming orifice outlet, an air chamber with an air chamber wall having a first internal side surface and a second external side surface, an external ink jet head orifice being provided through the air chamber wall from the first to second side surfaces and in axial alignment with the internal ink drop-forming orifice outlet, the air chamber being adapted to receive pressurized air which flows inwardly from the sides of the air chamber to form a generally concentric air stream surrounding the internal ink drop-forming orifice outlet and which air stream is directed out of the external ink jet head orifice, the air stream carrying ink drops produced at the internal ink drop-forming orifice outlet, in response to the pressure pulses, outwardly through the external ink jet head orifice and toward printing medium, the improvement comprising meniscus supporting means projecting from the ink chamber wall toward the air chamber wall in axial alignment with the external ink jet head orifice, the ink meniscus supporting means projecting substantially no further than to the first internal side surface of the air chamber wall, the ink menisus supporting means including an outer ink mensius supporting surface spaced from the ink chamber wall, the internal ink drop-forming orifice outlet being provided through the ink meniscus supporting surface, whereby a meniscus of ink at the internal ink drop-forming orifice outlet is confined to the ink meniscus supporting surface by the concentric air stream to thereby enhance the uniformity of ink drop formation by the ink jet head.

2. An apparatus according to claim 1 in which the ink meniscus supporting means comprises a generally frustoconical projection extending from the ink chamber wall toward the air chamber wall.

3. An apparatus according to claim 1 in which the ink meniscus supporting means comprises a mesa-like structure which is symmetrical about its longitudinal axis and which extends from the ink chamber wall toward the air chamber wall.

4. An apparatus according to claim 1 in which the outer end portion of the ink meniscus supporting means spaced from the ink chamber wall comprises a cylinder of circular cross section having an axis aligned with the axis of the external ink jet head orifice.

5. An apparatus according to claim 1 in which the ink meniscus supporting means comprises a cylinder of circular cross section having an axis aligned with the axis of the external ink jet head orifice.

6. An apparatus according to claim 1 in which the ink meniscus supporting surface is spaced from zero to forty microns from the plane of the first internal side surface of the air chamber wall.

7. An apparatus according to claim 6 in which the ink meniscus supporting surface is annular and has an outer diameter from approximately fifty to seventy microns.

8. An apparatus according to claim 7 in which the internal ink drop-forming orifice outlet is circular and is approximately thirty to forty-five microns in diameter and the external ink jet head orifice is of circular cross section and of a diameter from approximately one-hundred-twenty-five to two-hundred-twenty-five microns.

9. An apparatus according to claim 8 in which a recessed dimple is provided in the surface of the ink wall opposite to the surface from which the ink meniscus supporting means extends.

10. An apparatus according to claim 1 in which the ink meniscus supporting surface is spaced approximately fifteen microns from the plane of the first internal side surface of the air chamber wall and in which the ink meniscus supporting surface is annular and has an outer diameter of approximately sixty microns in diameter.

11. An apparatus according to claim 10 in which the internal ink drop-forming orifice outlet is circular and is approximately thirty microns in diameter, and in which the external ink jet head orifice is circular and is approximately one-hundred-fifty microns in diameter.

12. In an ink jet head including an ink chamber which is adapted to receive ink under pressure, the ink chamber having an ink chamber wall with a valve free ink passageway leading to an internal ink drop-forming orifice outlet, an actuator which applies a pressure pulse to the ink chamber so as to cause ink to flow through the ink passageway and produce an ink droplet at the interal ink drop-forming orifice otlet, an air chamber with an air chamber wall having internal and external side surfaces, an external ink jet head orifice being provided through the air chamber wall from the internal to the external side surfaces and in axial alignment with the internal ink drop-forming orifice outlet, the air chamber being adapted to receive pressurized air which flows inwardly from the sides of the air chamber to form a generally concentric air stream surrounding the internal ink drop-forming orifice outlet and which air stream is directed out of the external ink jet head orifice, the air stream carrying ink drops produced at the internal ink drop-forming orifice outlet, in response to the pressure pulses, outwardly through the external ink jet head orifice and toward printing medium, the improvement comprising air flow direction changing means axially aligned with the external ink jet head orifice outlet, the air flow direction changing means having outer side surfaces for diverting inwardly flowing air along the outer side surfaces and outwardly toward the external ink jet head orifice, the airflow direction changing means also having a top surface spaced from the ink chamber wall and bounded by the outer side surfaces, the top surface being spaced no further from the ink chamber wall than the plane of the internal side surface of the air chamber wall, the internal ink drop-forming orifice outlet being provided through the top surface, whereby air traveling along the outer side surfaces passes the boundary of the top surface and confines ink from the ink drop-forming orifice within the boundary of the top surface.

13. An apparatus according to claim 12 in which the outer end portion of the airflow direction changing means spaced from the ink chamber wall has an outer side surface which is cylindrical and with an axis which is parallel to the axis of the external ink jet head orifice so as to enhance the laminar flow of air passing the boundary of the top surface.

14. An apparatus according to claim 13 in which the outer end of the air flow direction changing means is of circular cross section and the external ink jet head orifice is also of circular cross section.

15. An apparatus according to claim 12 including means for supplying pressurized air to the air chamber and pressurized ink to the ink chamber, such means maintaining the air pressure approximately seven to fifteen inches of water higher than the ink pressure.

16. An apparatus according to claim 15 in which the last named means maintains the air pressure approximately ten inches of water higher than the ink pressure.

* * * * *